(12) United States Patent
Sako et al.

(10) Patent No.: US 7,742,037 B2
(45) Date of Patent: Jun. 22, 2010

(54) INPUT DEVICE, INPUT METHOD AND ELECTRONIC EQUIPMENT

(75) Inventors: Yoichiro Sako, Tokyo (JP); Toshiro Terauchi, Tokyo (JP); Makoto Inoue, Kanagawa (JP); Masamichi Asukai, Kanagawa (JP); Katsuya Shirai, Kanagawa (JP); Yasushi Miyajima, Kanagawa (JP); Kenichi Makino, Kanagawa (JP); Motoyuki Takai, Tokyo (JP)

(73) Assignee: Sony Corporation (JP)

( * ) Notice: Subject to any disclaimer, the term of this patent is extended or adjusted under 35 U.S.C. 154(b) by 1160 days.

(21) Appl. No.: 10/990,093

(22) Filed: Nov. 16, 2004

(65) Prior Publication Data
US 2005/0137825 A1  Jun. 23, 2005

(30) Foreign Application Priority Data
Dec. 10, 2003  (JP) .......................... P2003-412275

(51) Int. Cl.
*G01L 13/00* (2006.01)

(52) U.S. Cl. .......................... 345/156; 702/41; 702/138; 702/142; 715/701; 345/474

(58) Field of Classification Search ........................ None
See application file for complete search history.

(56) References Cited

U.S. PATENT DOCUMENTS

| | | | | |
|---|---|---|---|---|
| 4,429,627 A | * | 2/1984 | Edso ........................... | 100/35 |
| 5,877,741 A | * | 3/1999 | Chee et al. .................. | 345/629 |
| 5,982,357 A | * | 11/1999 | Burgett et al. ............... | 345/168 |
| 5,990,866 A | * | 11/1999 | Yollin ......................... | 345/157 |
| 6,190,314 B1 | * | 2/2001 | Ark et al. .................... | 600/300 |
| 6,522,333 B1 | * | 2/2003 | Hatlelid et al. .............. | 345/474 |
| 7,254,775 B2 | * | 8/2007 | Geaghan et al. ............. | 715/701 |
| 2002/0105427 A1 | * | 8/2002 | Hamamoto et al. ......... | 340/576 |
| 2003/0080945 A1 | * | 5/2003 | Betts-LaCroix ............. | 345/168 |
| 2003/0208324 A1 | * | 11/2003 | Bellwood et al. ............ | 702/41 |
| 2004/0174337 A1 | * | 9/2004 | Kubota et al. ............... | 345/156 |

FOREIGN PATENT DOCUMENTS

| | | |
|---|---|---|
| JP | 03-273409 A | 12/1991 |
| JP | 05-293253 A | 11/1993 |
| JP | 2001-034410 A | 2/2001 |

* cited by examiner

*Primary Examiner*—Amare Mengistu
*Assistant Examiner*—Jennifer Zubajlo
(74) *Attorney, Agent, or Firm*—Lerner, David, Littenberg, Krumholz & Mentlik, LLP

(57) ABSTRACT

A detection section that detects a key-tapping speed and key-tapping intensity is provided to detect a user's impatience level. An input device detects the key-tapping intensity and key-tapping speed. The input device compares the detection value of the key-tapping speed and an average key-tapping speed. When the detection value exceeds a stored normal key-tapping speed, the input device then compares the detection value of the key-tapping intensity and a reference pressure value. When the detection value exceeds a stored normal key-tapping intensity, information to be output for a user is changed over. In this case, displayed characters are enlarged and emphasized to a maximum extent. On the other hand, in the case where a detection value does not exceed the normal key-tapping speed and the detection value exceeds the normal key-tapping intensity, displayed characters are only slightly enlarged.

51 Claims, 4 Drawing Sheets

US 7,742,037 B2

INPUT DEVICE, INPUT METHOD AND ELECTRONIC EQUIPMENT

BACKGROUND OF THE INVENTION

1. Field of the Invention

The present invention relates to an input device, input method, and electronic equipment that detect psychological information of a user, and more particularly to, an input device and input method that detect a user's psychological state through normal operation performed by the user and an electronic equipment that detect a user's psychological state through operation performed by the user.

This application claims priority of Japanese Patent Application No. 2003-412275, filed on Dec. 10, 2003, the entirety of which is incorporated by reference herein.

2. Description of the Related Art

An electronic game device, which includes a liquid crystal display device or is connectable to a TV set, is configured to receive input of an instruction or data from a user through a controller provided with input keys to execute a program based on the input information. In a conventional electronic game device, however, a prepared program proceeds only by input operation from the user, which limits the fun of the game.

To cope with this, a configuration in which a detection means for detecting the excitement level of the player is provided in the controller to change the pattern of the game depending on the excitement level of the player is proposed. In particular, a technique that grasps the excitement level of the player by detecting sweating, heartbeat, blood pressure, body temperature, brain wave, key-tapping intensity, pronunciation, blinking, or the like to make the player more excited in the game plot is proposed (refer to, for example, Jpn. Pat. Appln. Laid-Open Publication No. 5-293253).

However, the calculation of psychological state from sweating, heartbeat, blood pressure, body temperature, brain wave, key-tapping intensity, pronunciation, blinking, or the like is normally executed based on the detection of highly accurate indicator and complicated analytical algorithm, incurring an increased processing load, which complicates the configuration of the controller (input section) for the detection.

SUMMARY OF THE INVENTION

An object of the present invention is to provide an input device and input method that can determine a user's psychological state from user's action at the input operation time and an electronic equipment that can determine a user's psychological state from user's action at the input operation time.

To attain the above object, an input device according to the present invention includes: one or more input operation members; a pressure intensity detection means that is included at least in an operation member and detects pressure intensity on the input operation member at input operation time; and a reference value calculation means for calculating a reference pressure value based on detection results of the pressure intensity that have been obtained by the pressure intensity detection means during a predetermined period or by predetermined number of input operations, thereby detecting pressure intensify acting on the input operation member at the user's input operation time.

The input device includes: a reference pressure value storage means for storing the pressure reference value; a pressure intensity comparison means for comparing detection results of the pressure intensity detected by the pressure intensity detection means and reference pressure value stored in the reference pressure value storage means; and a psychological state determination means for determining user's psychological state from the comparison result obtained by the pressure intensity comparison means, thereby comparing the detected value and stored reference pressure value with the pressure intensity comparison means and determines user's psychological state with the psychological state determination means. As an indicator for determining psychological state, there is available a change rate in detection results of the pressure intensity obtained by the pressure intensity detection means, the pressure intensity having been detected within a predetermined time period or predetermined number of input operations or a pressure intensity level detected by the pressure intensity detection means.

Further, the input device according to the present invention includes: a pressing frequency detection means that is included at least in an input operation member and is used in place of or in combination with the pressure intensity detection means to detect pressing number of the operation member per unit of time at input operation time; and a reference pressing frequency value calculation means for calculating a reference pressing frequency value based on detection results of the pressing number obtained by the pressing frequency detection means, the pressing number having been detected during a predetermined period, thereby detecting pressing frequency of the input operation member at the user's input operation time.

The input device includes: a pressing frequency comparison means for comparing detection results of the pressing number obtained by the pressing frequency detection means and reference pressing frequency value stored in a reference pressing frequency value storage means; and a psychological state determination means for determining user's psychological state from the comparison result obtained by the pressing frequency comparison means, thereby comparing the detection results of the pressing number and reference pressing frequency value with pressing frequency comparison section, and determining user's psychological state with the psychological state determination means.

In the case where a plurality of characters are assigned to one input operation member, and where the characters are changed for input depending on the number of times the same input operation member is pressed in succession, the pressing frequency detection means detects the number of times the same input operation member has been pressed in succession, and the psychological state determination means determines user's psychological state depending on whether the number of times the same input operation member has been pressed in succession exceeds a predetermined number or not.

Further, to attain the above object, electronic equipment according to the present invention includes an input device having: one or more input operation members; an operation unit that is included at least in one input operation member and includes a pressure intensity detection means for detecting pressure intensity on the operation member at input operation time; an information presentation means for presenting information; and a presentation control means for changing information presentation modes on the information presentation means depending on the pressure intensity detected in the pressure intensity detection means, the input device being provided in the operation section of equipment including a keyboard, mouse, numeric keypad, game controller, remote controller, touch panel, and mobile phone.

The electronic equipment includes: a reference pressure value calculation means for calculating a reference pressure value based on detection results of the pressure intensity that have been obtained by the pressure intensity detection means, the pressure intensity having been detected during a predetermined period or by a predetermined number of input operations with respect to the input operation member; a reference pressure value storage means for storing the pressure reference value; a pressure intensity comparison means for comparing detection results of the pressure intensity obtained by the pressure intensity detection means and reference pressure value stored in the reference pressure value storage means; and a psychological state determination means for determining user's psychological state from the comparison result obtained by the pressure intensity comparison means, wherein the presentation control means changes information presentation modes on the information presentation means based on the determination of the psychological state determination means. As an indicator for determining psychological state, there is available a change rate in detection results of the pressure intensity obtained by the pressure intensity detection means, the pressure intensity having been detected within a predetermined time period or predetermined number of input operations or a pressure intensity level detected in the pressure intensity detection means.

As for information presentation modes, there are cases where the information presentation means is a display means that displays at least one of video-image data, still-image data, and text data and/or where the information presentation means is a voice output means. In the case where the information presentation means is a display means, the presentation control means controls the brightness of an image displayed, the contrast of an image displayed, the size of an object to be displayed, the color of an object to be displayed, or blinks an object to be displayed on the display means. In the case where the information presentation means is a voice output means, the presentation control means controls the volume of a voice output from the voice output means and the tone of a voice output from the voice output means. Alternatively, these cases may be combined.

According to the input device and electronic equipment of the present invention, it is possible to detect a user's psychological state from the key-tapping speed and/or key-tapping intensity without a need for the user to explicitly perform an acquisition operation of indicators, creating a new entertainment service or a new technological application.

DETAILED DESCRIPTION OF THE PREFERRED EMBODIMENTS

Figure 1:
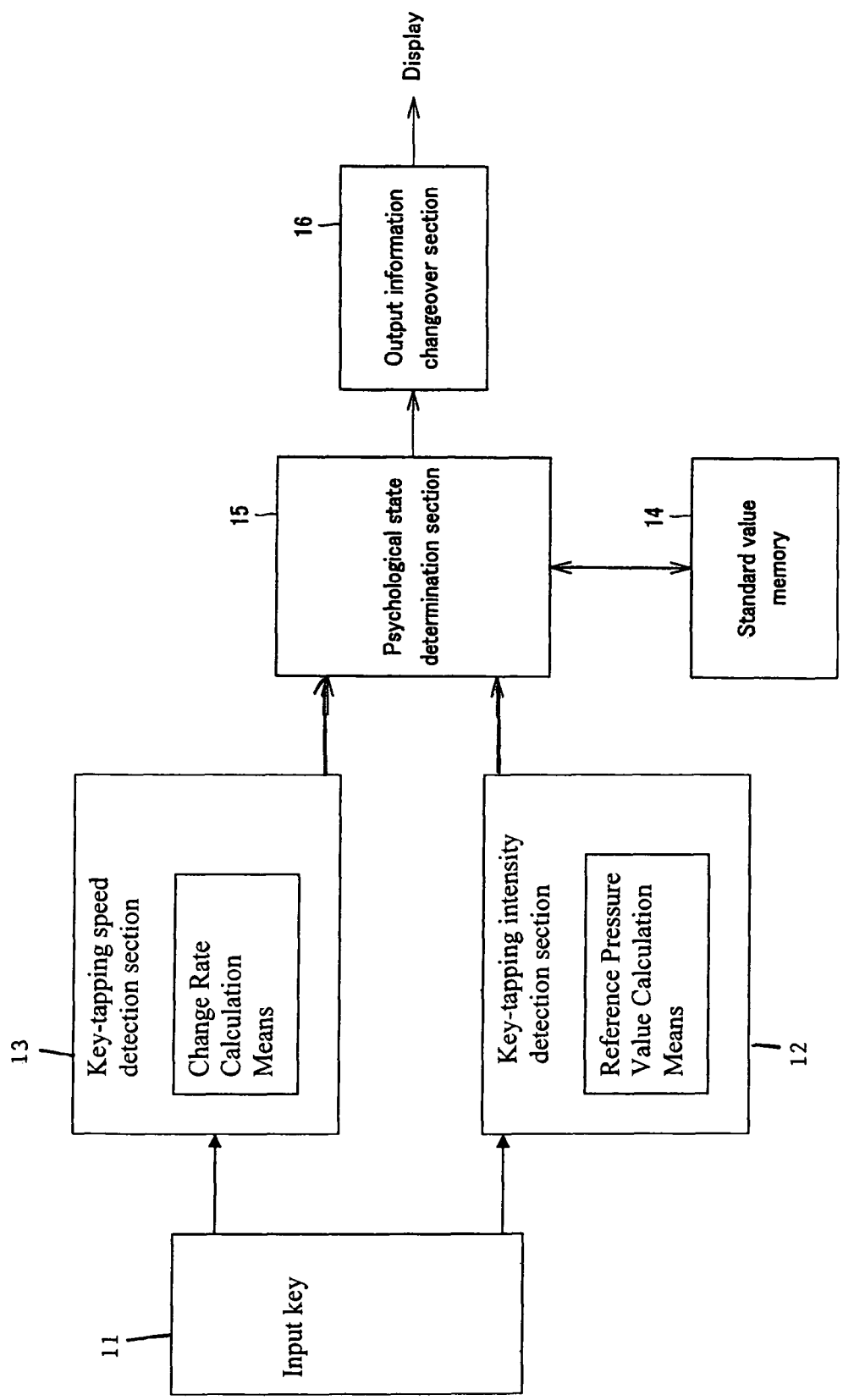
FIG. 1 is a configuration diagram for explaining an input device taken as a concrete example of the present invention.

A detailed description will be given of an embodiment of the present invention with reference to the accompanying drawings. An input device 1 taken as an embodiment of the present invention includes an input key 11 for a user to input an instruction or the like, a key-tapping intensity detection section 12 that detects the intensity with which the user operates the input key 11, a key-tapping speed detection section 13 that detects the speed with which the user operates the input key 11, a standard value memory 14 that stores standard values of the key-tapping pressure and key-tapping speed, a psychological state determination section 15 that determines a user's psychological state from the detected key-tapping intensity and/or key-tapping speed, and an output information changeover section 16 that changes over output information depending upon the user's psychological state.

In the input device 1, the input key 11 includes a keyboard, a numeric keypad, a mouse, a game controller, a remote controller, a touch panel and the like.

The key-tapping intensity detection section 12 is provided in the input key 11 and detects a pressing force on the key while the user operates the key. The key-tapping intensity detection section 12 includes a reference value calculation section (not shown) that calculates a reference value of the pressing force of the user based on detection results of the pressing force that have been obtained during a predetermined period or by a predetermined number of times and sends the calculated reference pressure value to the standard value memory 14. In this embodiment, the key-tapping intensity detection section 12 is a pressure sensor.

Note that the pressure sensor includes an analog pressure sensor that successively changes a detection value depending on the pressing force for output and a digital pressure sensor that outputs the detection value in a phased or discrete manner. The present invention can be applied to the both pressure sensors.

The key-tapping speed detection section 13 is provided in the input key 11 and detects the number of times the key has been pressed, that is, key-tapping speed per unit of time during the input operation. The key-tapping speed detection section 13 includes a key-tapping speed calculation section (not shown) that calculates the user's average key-tapping number per unit of time based on detection results of the key-tapping number that have been obtained during a predetermined period and sends the calculated the average key-tapping number to the standard value memory 14. The calculation of the key-tapping speed is realized by obtaining the number of times user's actions have been made to the input key 11 using the abovementioned pressure sensor.

The standard value memory 14 stores the reference pressure value calculated by the reference value calculation section and the average key-tapping speed calculated by the key-tapping speed calculation section. The reference pressure value and average key-tapping speed to be stored in the standard value memory 14 may previously be input by the user at the time of purchase or the like, or may be calculated based on the data periodically collected in the normal use time.

The psychological state determination section 15 includes a comparison section. With the comparison section, the psychological state determination section 15 compares a standard value and detection value with respect to the pressing force of the user calculated by the key-tapping intensity detection section 12 and key-tapping speed detected by the key-tapping speed detection section 13, and determines whether the user performs input operations in a normal state, thereby judging the user's psychological state. For example, most people in a panic situation will make many errors in the work that they perform without difficulty in a normal state, or the more they think that they should hurry up, the more awkward their movements become, so that they cannot take quick physical action. That is, the case where a high pressing force is detected regardless of a low input speed indicates that the user is in an upset state and thereby input speed may not be increased (the user is so rushing that he or she is running around in circles).

To cope with this, in the present embodiment, user's "impatience" is allowed to be detected from the key-tapping intensity and key-tapping speed obtained in association with the user's input operation. As the indicator for determining psychological state, the pressing force detected by the key-tapping intensity detection section 12 and time-fluctuation or level of the key-tapping speed are available. For example, it can be determined that the user is not in a normal state when the detection value of the key-tapping intensity shifts considerably from an average value and/or the detection value of the key-tapping speed shifts significantly from an average key-tapping speed. Further, in the case where the average detection value obtained by averaging the values of the key-tapping intensity detected during a predetermined period or a predetermined key-tapping number does not shift considerably from a standard value of the key-tapping intensity even if the detection value of the key-tapping intensity is increased for a quick moment, it is determined that the user is in a normal state. On the other hand, in the case where the detection values of the key-tapping intensity in the above range considerably vary, it is determined that the user is not in a normal state.

The output information changeover section 16 changes over information to be output for the user, or gives the user a warning about the current psychological state ("impatience" state).

Figure 2:
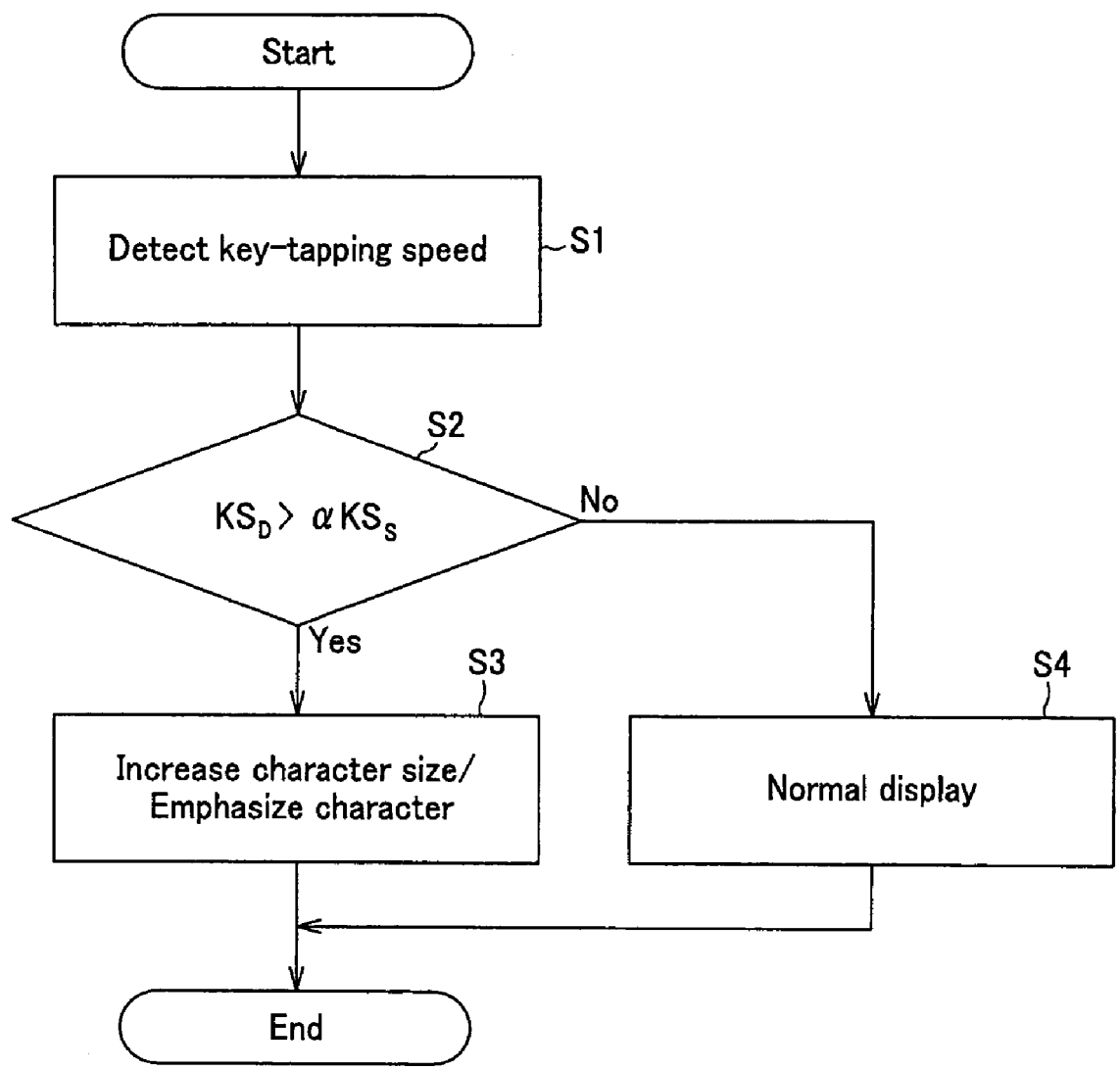
FIG. 2 is a flowchart for explaining a process in which the input device determines a user's psychological state and changes information to be provided.

Next, a process of determining a user's psychological state and changing over information to be provided for the user performed in the input device 1 will be described with reference to FIGS. 2 and 3. It is assumed hereinafter that the key-tapping speed detected by the key-tapping speed detection section 13 is $KS_D$, and average key-tapping speed is $KS_S$. In step S1, the input device 1 allows the key-tapping speed detection section 13 to detect a key-tapping speed. The input device 1 then compares the detection value $KS_D$ and average key-tapping speed $KS_S$ in step S2. In the present embodiment, threshold value α for changing over information to be output by the output information changeover section 16 is set at 1.2 times the normal key-tapping speed. When the detection value exceeds the normal key-tapping speed in step S2, information to be output for the user is changed over in step S3. On the other hand, in the case where a detection value does not exceed the normal key-tapping speed in step S2, a normal display state is continued without change.

Figure 3:
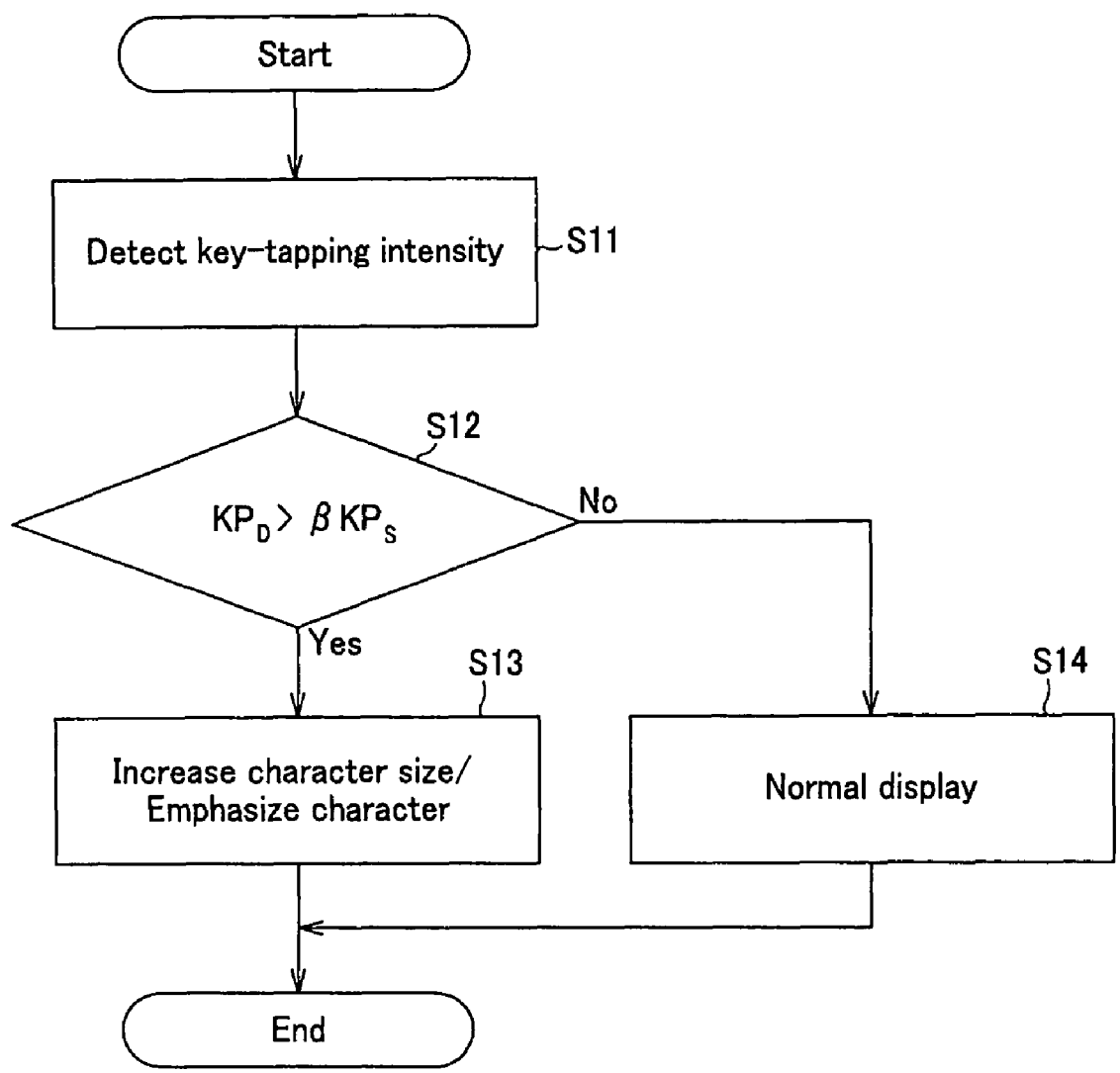
FIG. 3 is a flowchart for explaining a process in which the input device determines a user's psychological state and changes information to be provided.

In the case of FIG. 3, it is assumed that the key-tapping pressure detected by the key-tapping intensity detection section 12 is $KP_D$, and reference intensity value is $KP_S$. In step S11, the input device 1 allows the key-tapping intensity detection section 12 to detect a key-tapping intensity. The input device 1 then compares the detection value $KP_D$ and the reference pressure value $KP_S$ in step S12. In the present embodiment, threshold value β for changing over information to be output by the output information changeover section 16 is set at 1.4 times the normal key-tapping intensity. When the detection value exceeds the normal key-tapping intensity in step S12, information to be output for the user is changed over in step S13. On the other hand, in the case where a detection value does not exceed the normal key-tapping intensity in step S12, a normal display state is continued without change.

The changeover of information to be output performed in steps S3 and S13 includes, for example, increasing the size of displayed characters, emphasizing displayed characters, generating beep sound or the like for warning, giving the user a warning "KEEP YOUR COOL" or the like, changing the color of a display screen, blinking an object to be displayed, and the like.

Figure 4:
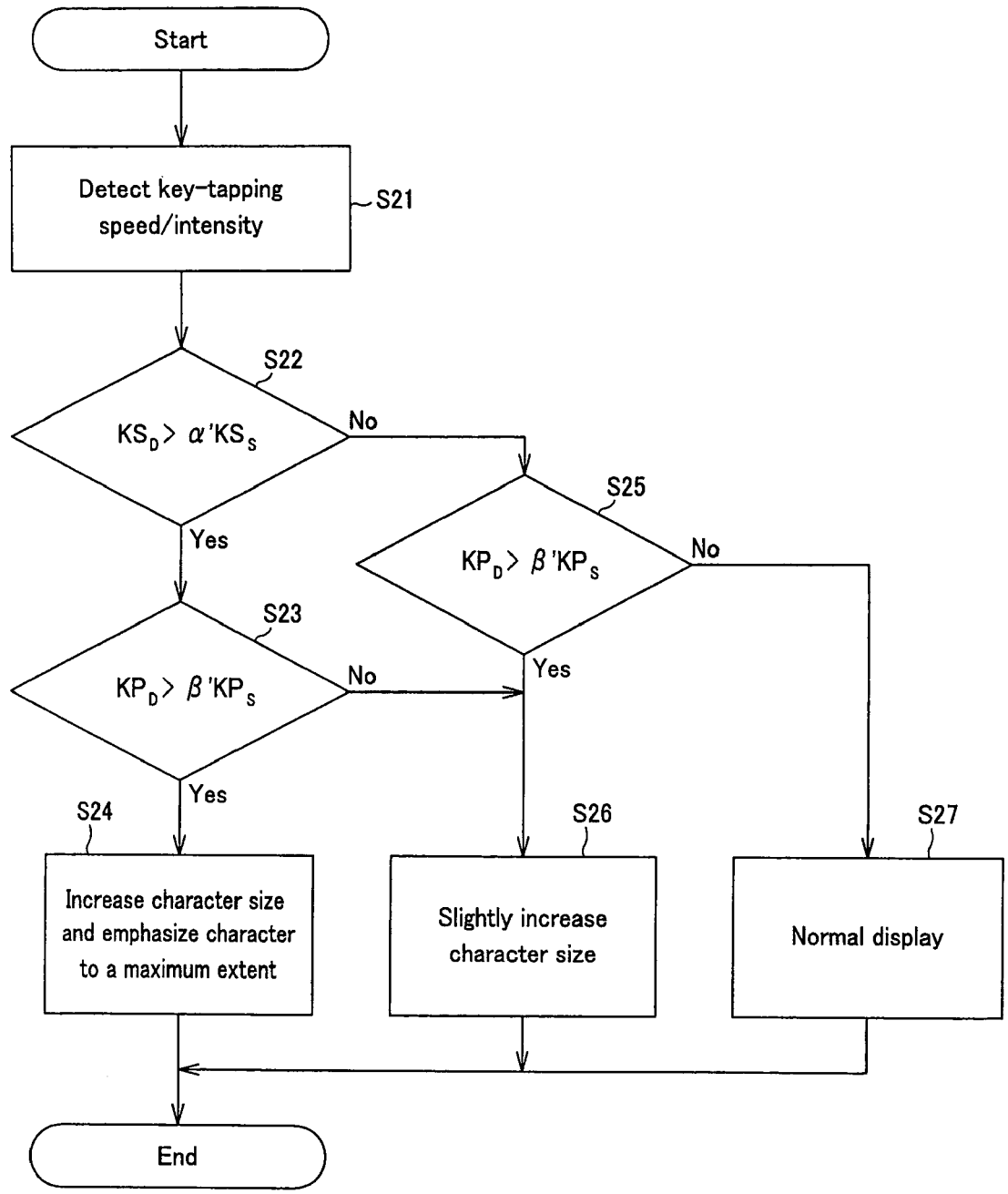
FIG. 4 is a flowchart for explaining a process in which the input device determines a user's psychological state and changes information to be provided.

The determination may be made in an integrated manner using both the key-tapping speed and key-tapping intensity. The process performed in this case is shown in FIG. 4. In step S21, the input device 1 allows the key-tapping intensity detection section 12 to detect a key-tapping intensity and allows the key-tapping speed detection section 13 to detect a key-tapping speed. The input device 1 firstly compares the detection value $KS_D$ and average key-tapping speed $KS_S$ in step S22. When the detection value exceeds the normal key-tapping speed in step S22, the input device 1 then compares the detection value $KP_D$ and the reference pressure value $KP_S$ in step S23. When the detection value exceeds the normal key-tapping pressure in step S23, information to be output for the user is changed over in step S24. In this case, displayed characters are enlarged and emphasized to a maximum extent.

On the other hand, in the case where a detection value does not exceed the normal key-tapping speed in step S22 and the detection value exceeds the normal key-tapping intensity in step S25 (the same determination process as step S23), displayed characters are slightly enlarged in step S26.

In the case where a detection value does not exceed the normal key-tapping speed in step S22 and the detection value falls within a range of the normal key-tapping intensity in step S25, a normal display state is continued without change in step S27.

FIG. 4 shows the process for mainly determining user's impatience level. It is preferable that in the case of low $KS_D$ value and high $KP_D$ value, output information be changed, that is, displayed characters be enlarged and emphasized to a maximum extent.

As described above, the input device 1 according to the embodiment of the present invention can detect the user's psychological state such as user's "impatience level" from the "intensity" and "speed" acting on the input key at the input operation time.

The input device 1 in the present embodiment uses, in a mixed manner, detection values detected using the key-tapping intensity detection section 12 in combination with the key-tapping speed detection section 13. However, the input device 1 may include either the key-tapping intensity detection section 12 or key-tapping speed detection section 13. Further, in the case of using, for example, a numeric keypad or remote controller including a plurality of input keys, it may include at least one input key that can detect the key-tapping speed or key-tapping intensity. As the method of detecting user's psychological state from the action with respect to the input key 11, there is also available a method of detecting the number of times a correct key has been pressed per unit of time to correct input characters. That is, in the case where the correct key has been pressed more frequently than a threshold value when a high key-tapping speed is detected, it is determined that the user is in an upset state. The determination of user's psychological state may be made depending on whether the correct key has been pressed hard or not. Examples of the correct key include an undo key for reversing the result of the immediately preceding operation, a back space key for deleting an immediately preceding key input, an escape key for canceling an immediately preceding key input, a delete key for deleting input characters, and the like.

Further, a method of monitoring the number of times a certain key has been pressed in succession is available. There are small-sized portable equipments such as mobile phones having a configuration in which a plurality of characters are assigned to an input key. In such equipments, when a desired character is passed through in character input operation, the user must press a certain key in succession until the desired character has been displayed after a turnaround of the character list. Thus, in the case of using input key having the configuration in which input characters are changed every time a certain key is pressed, the user's psychological state is determined depending on whether the number of times the same key has been pressed in succession exceeds a predetermined number or not.

The input key 11 may be rotatable. In this case, it is possible to easily detect notch number, reverse rotation due to an overrun, rotational speed. Further, the input key 11 may be an electromagnetic induction type input key. In this case, a voltage proportional to the key-tapping speed can be detected, so that it is possible to easily measure the key-tapping intensity and key-tapping speed.

The key-tapping is performed by user's fingers in the case of the above-mentioned input key. Whereas, in a PDA (Personal Digital Assistant) or the like including a touch panel, input operation is performed by pressing icons or software keys printed or displayed on the touch panel with an accompanying stylus or pen tip.

The present invention is applicable to any input section of electronic equipment. It is thus possible to obtain the user's psychological state by detecting the key-tapping number and key-tapping intensity, creating a new entertainment service and a new technological application.

What is claimed is:

1. An input device comprising:
   an input operation member;
   pressure intensity detection means for detecting a pressure intensity on the input operation member by a user at an input operation time;
   pressing frequency detection means for detecting a pressing number by the user of the operation member per unit of time at the input operation time;
   reference pressure value calculation means for calculating a reference pressure value based on detection results of a pressure intensity obtained by the pressure intensity detection means during a first predetermined period or by a predetermined number of input operations with respect to the input operation member;
   reference pressing frequency value calculation means for calculating a reference pressing frequency value based on detection results of a pressing number obtained by the pressing frequency detection means during a second predetermined period; pressure intensity comparison means for comparing detection results of the pressure intensity detected by the pressure intensity detection means at the input operation time and the reference pressure value; pressing frequency comparison means for comparing detection results of the pressing number obtained by the pressing frequency detection means at the input operation time and the reference pressing frequency value; and
   psychological state indication determination means for determining an indication of the user's psychological state using input operations by the user detected only by the pressure intensity detection means and the pressing frequency detection means, wherein the psychological state indication determination means is for determining a reference indication of the user's psychological state using only the reference pressure value and the reference pressing frequency value, and for determining an indication of the psychological state of the user at the input operation time, in relation to the reference indication, using the comparison results obtained by the pressure intensity comparison means and the pressing frequency comparison means.

2. The input device according to claim 1, further comprising:
   reference pressure value storage means for storing the pressure reference value.

3. The input device according to claim 1, further comprising:
   change rate calculation means for calculating a change rate in detection results of the pressure intensity obtained by the pressure intensity detection means at the input operation time, the pressure intensity having been detected at the input operation time within a predetermined time period or predetermined number of input operations; and
   wherein the psychological state indication determination means is for determining the indication of the user's psychological state at the input operation time, in relation to the reference indication, using the calculation result obtained by the change rate calculation means at the input operation time.

4. The input device according to claim 1, further comprising:
   level storage means for storing indicators in which pressure intensity values are classified into a plurality of levels;
   wherein the pressure intensity comparison means is for comparing the detection results of the pressure intensity detected by the pressure intensity detection means at the input operation time and a pressure intensity level stored in the level storage means; and
   level determination means for determining the user's pressure intensity level from the comparison result obtained by the pressure intensity comparison means.

5. The input device according to claim 1, wherein
   a plurality of characters are assigned to the input operation member, the characters being changed for input depending on a number of times a same input operation member is pressed in succession,
   wherein the pressing frequency detection means is for detecting the number of times the same input operation member has been pressed in succession, and
   wherein the psychological state indication determination means is for determining the indication of the user's psychological state at the input operation time, in relation to the reference indication, based on whether the number of times the same input operation member has been pressed in succession at the input operation time exceeds a predetermined number.

6. The input device according to claim 1, wherein the input operation member comprises a correct operation member that corrects a previous input operation.

7. The input device according to claim 1, wherein the input operation member comprises one of:
   a keyboard, mouse, numeric keypad, game controller, remote controller, touch panel, and mobile phone.

8. An input device comprising:
   an input operation member;
   pressing frequency detection means for detecting a pressing number by a user of the operation member per unit of time at an input operation time;
   reference pressing frequency value calculation means for calculating a reference pressing frequency value based on detection results of a pressing number obtained by the pressing frequency detection means during a predetermined period;

pressing frequency comparison means for comparing detection results of the pressing number obtained by the pressing frequency detection means at the input operation time and the reference pressing frequency value;

and psychological state indication determination means for determining an indication of the user's psychological state using input operations by the user detected only by the frequency detection means, where in the psychological state indication determination means is for determining a reference indication of the user's psychological state using only the reference frequency value, and for determining an indication of the psychological state of the user at the input operation time, in relation to the reference indication, using the comparison result obtained by the pressing frequency comparison means.

9. The input device according to claim 8, further comprising:

reference pressing frequency value storage means for storing the reference pressing frequency value.

10. The input device according to claim 8, further comprising:

change rate calculation means for calculating a change rate in detection results of the pressing number obtained by the pressing frequency detection means at the input operation time, the pressing number having been detected at the input operation time within a predetermined time period or predetermined number of input operations; and wherein the psychological state indication determination means is for determining the indication of the user's psychological state at the input operation time, in relation to the reference indication, using the calculation result obtained by the change rate calculation means at the input operation time.

11. The input device according to claim 8, further comprising:

level storage means for storing indicators in which pressure frequency values are classified into a plurality of levels;

pressing frequency comparison means for comparing detection results of the pressing numbers obtained by the pressing frequency detection means at the input operation time and a pressing frequency level stored in the level indicator storage means; and level determination means for determining the user's pressing frequency level from the comparison result obtained by the pressing frequency comparison means.

12. The input device according to claim 8, wherein a plurality of characters are assigned to the input operation member, the characters being changed for input depending on a number of times a same input operation member is pressed in succession, the pressing frequency detection means is for detecting the number of times the same input operation member has been pressed in succession, and wherein the psychological state indication determination means is for determining the indication of the user's psychological state at the input operation time, in relation to the reference indication, based on whether the number of times the same input operation member has been pressed in succession at the input operation time exceeds a predetermined number or not.

13. The input device according to claim 8, wherein the input operation member comprises a correct operation member that corrects a previous input operation.

14. The input device according to claim 8 wherein the input operation member comprises one of a keyboard, mouse, numeric keypad, game controller, remote controller, touch panel, and mobile phone.

15. An electronic equipment comprising:

an input operation member;

an operation unit including pressure intensity detection means for only detecting a pressure intensity on the input operation member by a user at an input operation time; information presentation means for presenting information;

change rate calculation means for calculating a change rate in detection results of the pressure intensity obtained by the pressure intensity detection at the input operation time, the pressure intensity having been detected at the input operation time within a predetermined time period or predetermined number of input operations;

psychological state indication determination means for determining an indication of the user's psychological state using input operations by the user detected only by the pressure intensity detection means, wherein the psychological state indication determination means is for determining an indication of the user's psychological state at the input operation time, in relation to a reference indication of the user's psychological state, using the calculation result obtained by the change rate calculation means at the input operation time; and presentation control means for changing information presentation modes on the information presentation means to change presentation of the information based on the determination of the indication of the user's psychological state at the input operation time, in relation to the reference indication, by the psychological state determination means.

16. The electronic equipment according to claim 15, further comprising:

reference pressure value calculation means for calculating a reference pressure value based on detection results of the pressure intensity obtained by the pressure intensity detection means, the pressure intensity having been detected during a predetermined period or by a predetermined number of input operations with respect to the input operation member;

reference pressure value storage means for storing the pressure reference value;

pressure intensity comparison means for comparing detection results of the pressure intensity obtained by the pressure intensity detection means at the input operation time and the reference pressure value stored in the reference pressure value storage means; and wherein the psychological state indication determination means is for determining the reference indication of the user's psychological state using the reference pressure value and for determining the indication of the user's psychological state at the input operation time, in relation to the reference indication, using the comparison result obtained by the pressure intensity comparison means.

17. The electronic equipment according to claim 15, further comprising:

level storage means for storing indicators in which pressure intensity values are classified into a plurality of levels;

pressure intensity comparison means for comparing detection results of the pressure intensity obtained by the pressure intensity detection means at the input operation time and a pressure intensity level stored in the level storage means; and level determination means for determining the user's pressure intensity level from the comparison result obtained by the pressure intensity comparison means, wherein the presentation control means is for changing information presentation modes on the information presentation means to change presentation of the information based on the determination of the level determination means.

18. The electronic equipment according to claim 15, wherein the input operation member is a correct operation member that corrects a previous input operation.

19. The electronic equipment according to claim 15, wherein the information presentation means comprises a display means for displaying at least one of video-image data, still-image data, and text data.

20. The electronic equipment according to claim 19, wherein the presentation control means controls a brightness of an image displayed on the display means.

21. The electronic equipment according to claim 19, wherein the presentation control means controls a contrast of an image displayed on the display means.

22. The electronic equipment according to claim 19, wherein the presentation control means changes a size of an object displayed on the display means.

23. The electronic equipment according to claim 19, wherein the presentation control means changes a color of an object displayed on the display means.

24. The electronic equipment according to claim 19, wherein the presentation control means blinks an object displayed on the display means.

25. The electronic equipment according to claim 15, wherein the information presentation means comprises a voice output means.

26. The electronic equipment according to claim 25, wherein the presentation control means controls a volume of a voice output from the voice output means.

27. The electronic equipment according to claim 25, wherein the presentation control means controls a tone of a voice output from the voice output means.

28. An electronic equipment comprising:

an input operation member;

an operation unit including pressing frequency detection means for only detecting a pressing number of the input operation member by a user per unit of time at an input operation time;

information presentation means for presenting information;

reference pressing frequency value calculation means for calculating a reference pressing frequency value from a pressing number detected by the pressing frequency detection means during a predetermined period;

reference pressing frequency value storage means for storing the reference pressing frequency value;

pressing frequency comparison means for comparing detection results of the pressing number obtained by the pressing frequency detection means at the input operation time and the reference pressing frequency value stored in the reference pressing frequency value storage means;

psychological state indication determination means for determining an indication of the user's psychological state using input operations by the user detected only by the pressing frequency detection means, wherein the psychological state indication determination means is for determining an indication of the user's psychological state at the input operation time, in relation to a reference indication of the user's psychological state determined from the reference pressing frequency value, using the comparison results obtained by the pressing frequency comparison means; and presentation control means for changing information presentation modes on the information presentation means to change presentation of the information based on the determination of the indication of the user's psychological state at the input operation time, in relation to the reference indication, by the psychological state indication determination means.

29. The electronic equipment according to claim 28, further comprising:

change rate calculation means for calculating a change rate in detection results of the pressing number obtained by the pressing frequency detection means at the input operation time, the pressing number having been detected at the input operation time within a predetermined time period or predetermined number of input operations; and wherein the psychological state indication determination means is for determining the indication of the user's psychological state, in relation to the reference indication of the user's psychological state, using a calculation result obtained by the change rate calculation means at the input operation time.

30. The electronic equipment according to claim 28, further comprising:

level storage means for storing indicators in which pressure frequency values are classified into a plurality of levels;

pressing frequency comparison means for comparing detection results of the pressing number obtained in the pressing frequency detection means at the input operation time and a pressing frequency level stored in the level storage means; and level determination means for determining the user's pressing frequency level from the comparison result obtained by the pressing frequency comparison means, wherein the presentation control means is for changing information presentation modes on the information presentation means to change presentation of the information based on the determination of the level determination means.

31. The electronic equipment according to claim 28, wherein a plurality of characters are assigned to the input operation member, the characters being changed for input depending on a number of times a same input operation member is pressed in succession, the pressing frequency detection means is for detecting the number of times the same input operation member has been pressed in succession, and the psychological state indication determination means is for determining the indication of the user's psychological state, in relation to the reference indication of the user's psychological, based on whether the number of times the same input operation member has been pressed in succession at the input operation time exceeds a predetermined number.

32. The electronic equipment according to claim 28, wherein the input operation member is a correct operation member that corrects a previous input operation.

33. The electronic equipment according to claim 28, wherein the information presentation means comprises display means that displays at least one of video-image data, still-image data, and text data.

34. The electronic equipment according to claim 33, wherein the presentation control means controls a brightness of an image displayed on the display means.

35. The electronic equipment according to claim 33, wherein the presentation control means controls a contrast of an image displayed on the display means.

36. The electronic equipment according to claim 33, wherein the presentation control means changes a size of an object displayed on the display means.

37. The electronic equipment according to claim 33, wherein the presentation control means changes a color of an object displayed on the display means.

38. The electronic equipment according to claim 33, wherein the presentation control means blinks an object displayed on the display means.

39. The electronic equipment according to claim 28, wherein the information presentation means comprises voice output means.

40. The electronic equipment according to claim 39, wherein the presentation control means controls a volume of a voice output from the voice output means.

41. The electronic equipment according to claim 39, wherein the presentation control means controls a tone of a voice output from the voice output means.

42. An input method comprising the steps of:
    detecting pressure intensity by a user on an input operation member at an input operation time;
    calculating a reference pressure value based on detection results of a pressure intensity that have been obtained during a predetermined period or by predetermined number of input operations with respect to the input operation member;
    calculating a change rate in detection results of the pressure intensity obtained at the input operation time within a predetermined time period or predetermined number of input operations with respect to the input operation member; and
    determining an indication of the user's psychological state using input operations by the user detected only for the pressure intensity, wherein an indication of the user's psychological state at the input operation time, in relation to a reference indication of the user's psychological state determined using the reference pressure value, is determined using the calculated change rate at the input operation time.

43. The input method according to claim 42, further comprising the steps of:
    comparing detection results of the pressure intensity at the input operation time and the reference pressure value; and
    determining the indication of the user's psychological state, in relation to the reference indication of the user's psychological state, using the comparison result.

44. The input method according to claim 42, further comprising the steps of:
    calculating a change rate in detection results of the pressure intensity obtained within a predetermined time period or predetermined number of input operations; and
    determining the indication of the user's psychological state, in relation to the reference indication of the user's psychological state, from the calculation result at the input operation time.

45. The input method according to claim 42, wherein the input operation member is a correct operation member and further comprising the step of correcting a previous input operation.

46. An input method comprising:
    detecting a pressing number of ant-rim input operation member by a user per unit of time at an input operation time;
    calculating a reference pressing frequency value based on detection results of a pressing number obtained during a predetermined period;
    comparing detection results of the pressing number at the input operation time and the reference pressing frequency value; and
    determining an indication of the user's psychological state using input operations by the user detected only for the pressing number, wherein an indication of the user's psychological state at the input operation time, in relation to a reference indication of the user's psychological state determined from the reference pressing frequency value, is determined based on the comparison result.

47. The input method according to claim 46, wherein
    a plurality of characters are assigned to the input operation member, the characters being changed for input depending on a number of times a same input operation member is pressed in succession,
    the method further comprising the steps of:
    detecting a number of times a same input operation member has been pressed in succession; and
    determining the indication of the user's psychological state, in relation to the reference indication of the user's psychological state, based on whether the number of times the same input operation member has been pressed in succession at the input operation time exceeds a predetermined number.

48. The input method according to claim 46, wherein the input operation member is a correct operation member and further comprising the step of correcting a previous input operation.

49. An input method comprising the steps of:
    detecting a pressing number of an input operation member by a user per unit of time at an input operation time;
    detecting pressure intensity by a user on an input operation member at the input operation time;
    calculating a reference pressure value based on detection results of a pressure intensity that have been obtained during a first predetermined period or by predetermined number of input operations with respect to the input operation member;
    calculating a reference pressing frequency value based on detection results of a pressing number obtained during a second predetermined period;
    comparing detection results of the pressing number obtained at the input operation time and the reference pressing frequency value; and
    comparing detection results of the pressure intensity obtained at the input operation time and the reference pressure value; and
    determining an indication of the user's psychological state using input operations by the user detected only for the pressure intensity and the pressing number, wherein an indication of the user's psychological state at the input operation time, in relation to a reference indication of the user's psychological state determined using the reference pressure value and the reference pressing frequency value, is determined based on the pressure frequency comparison results and the pressure intensity comparison results.

50. The input method according to claim 49, wherein
a plurality of characters is assigned to the input operation member, the characters being changed for input depending on a number of times a same input operation member is pressed in succession;
the method further comprising the steps of:
detecting a number of times a same input operation member has been pressed in succession; and
determining the indication of the user's psychological state, in relation to the reference indication of the user's psychological state, based on whether the number of times the same input operation member has been pressed in succession at the input operation time exceeds a predetermined number.

51. The input method according to claim 49, further comprising the steps of:
calculating a change rate in detection results of the pressure intensity obtained at the input operation time within a predetermined time period or predetermined number of input operations; and
determining the indication of the user's psychological state at the input operation time, in relation to the reference indication of the user's psychological state, based on the calculation result at the input operation time.

* * * * *